March 11, 1958  W. A. SCHEUBLEIN, JR., ET AL  2,826,407
OVERLOAD SPRING FOR VEHICLE
Filed Sept. 27, 1954  8 Sheets-Sheet 1
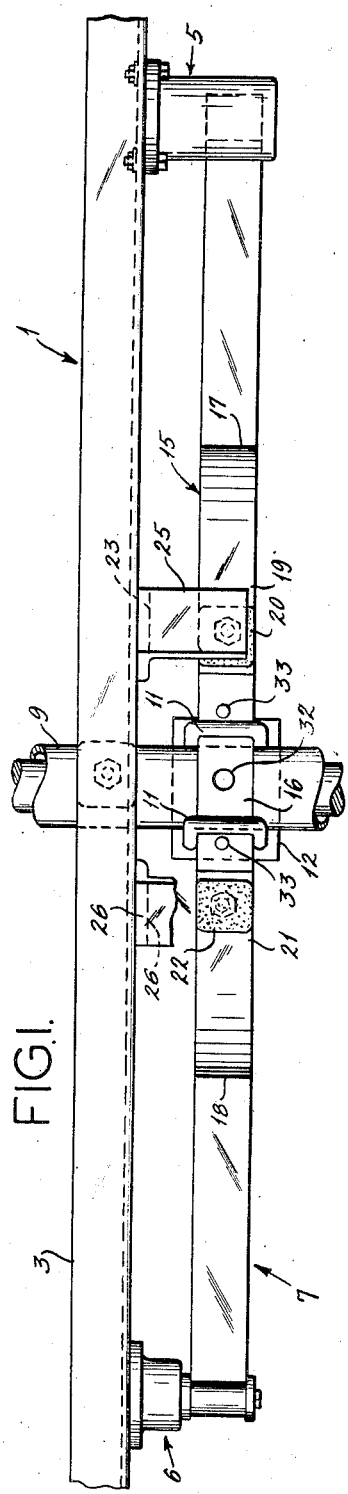
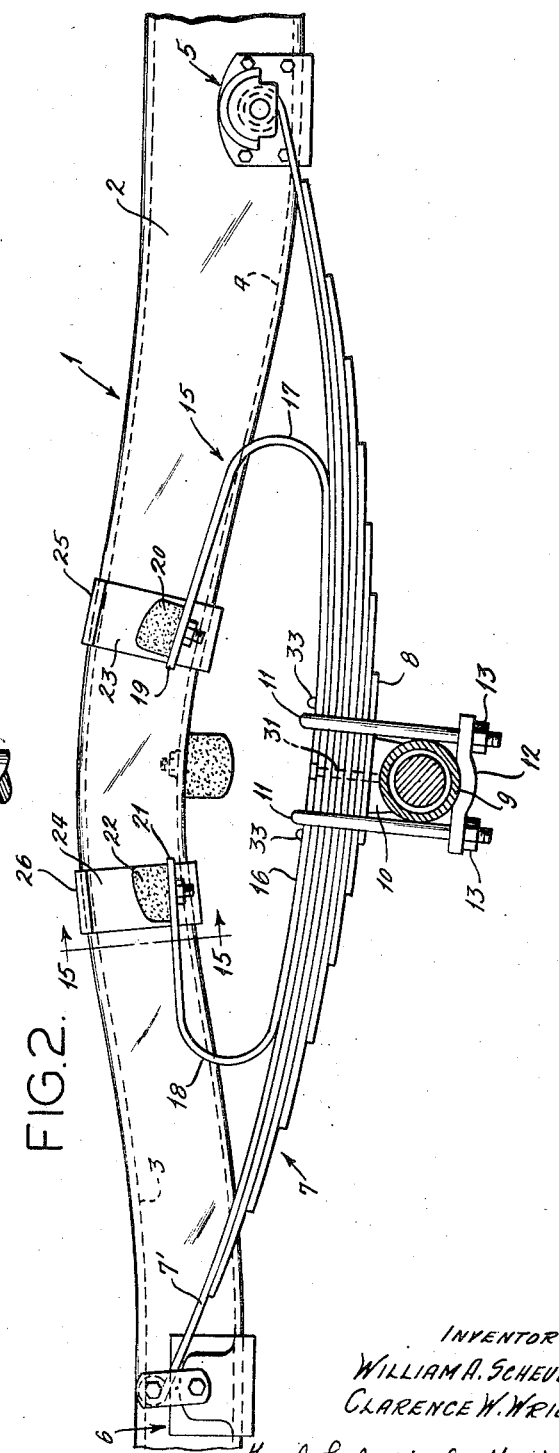
INVENTORS
WILLIAM A. SCHEUBLEIN JR.
CLARENCE W. WRIGHT
By Gravely, Lieder, Woodruff & Wills
ATTORNEYS March 11, 1958   W. A. SCHEUBLEIN, JR., ET AL   2,826,407
OVERLOAD SPRING FOR VEHICLE
Filed Sept. 27, 1954   8 Sheets-Sheet 2

INVENTORS
WILLIAM A. SCHEUBLEIN JR.
CLARENCE W. WRIGHT
By Gravely, Lieder, Woodruff & Wills
ATTORNEYS March 11, 1958 W. A. SCHEUBLEIN, JR., ET AL 2,826,407
OVERLOAD SPRING FOR VEHICLE
Filed Sept. 27, 1954 8 Sheets-Sheet 3

INVENTORS
WILLIAM A. SCHEUBLEIN JR.
CLARENCE W. WRIGHT
By Gravely, Lieder, Woodruff & Wills
ATTORNEYS

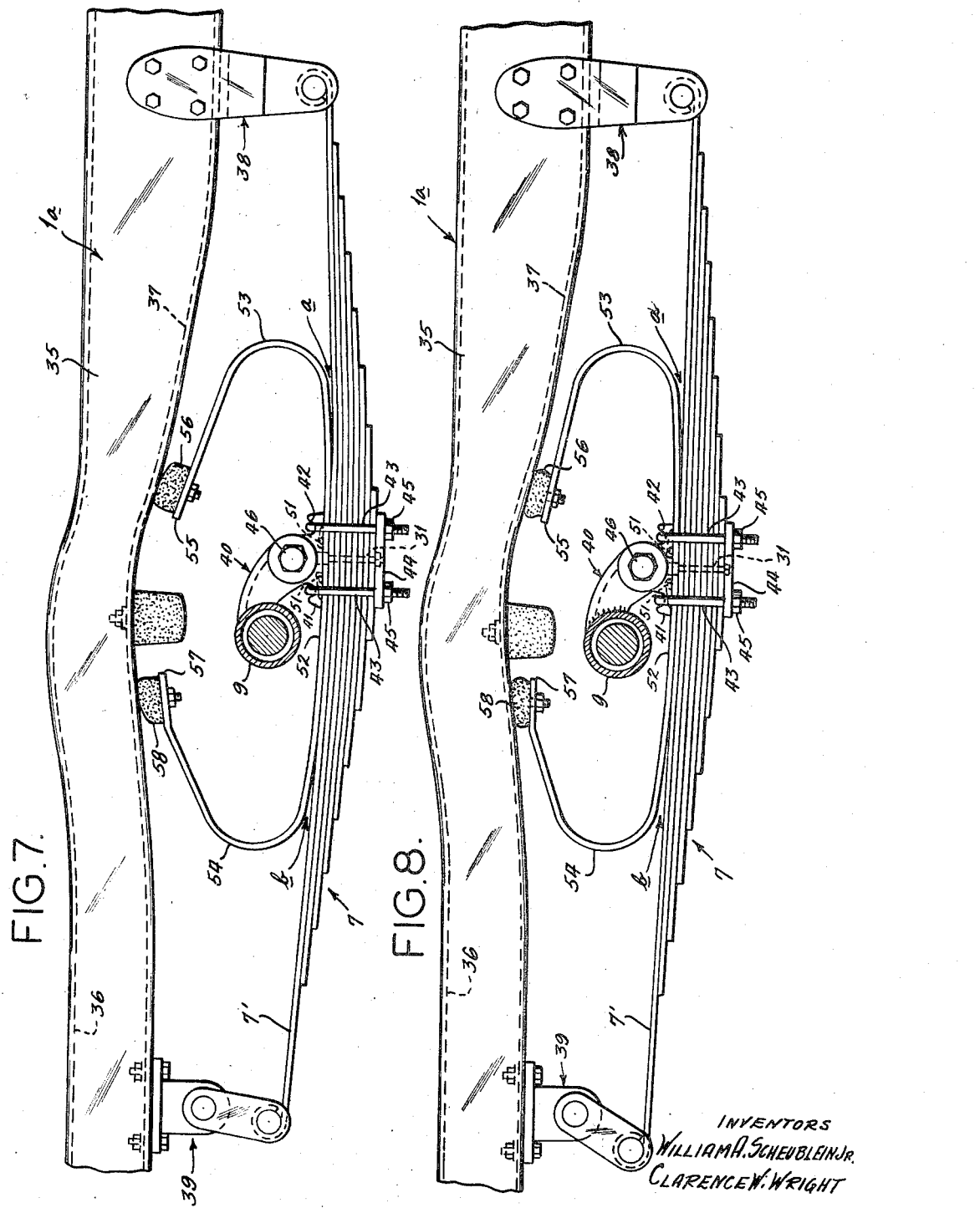

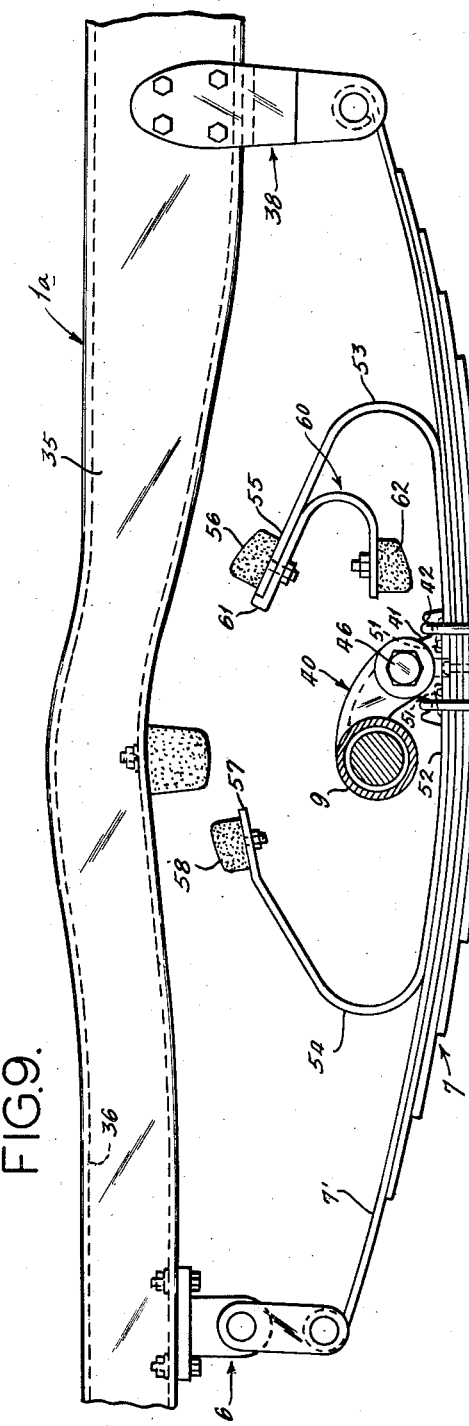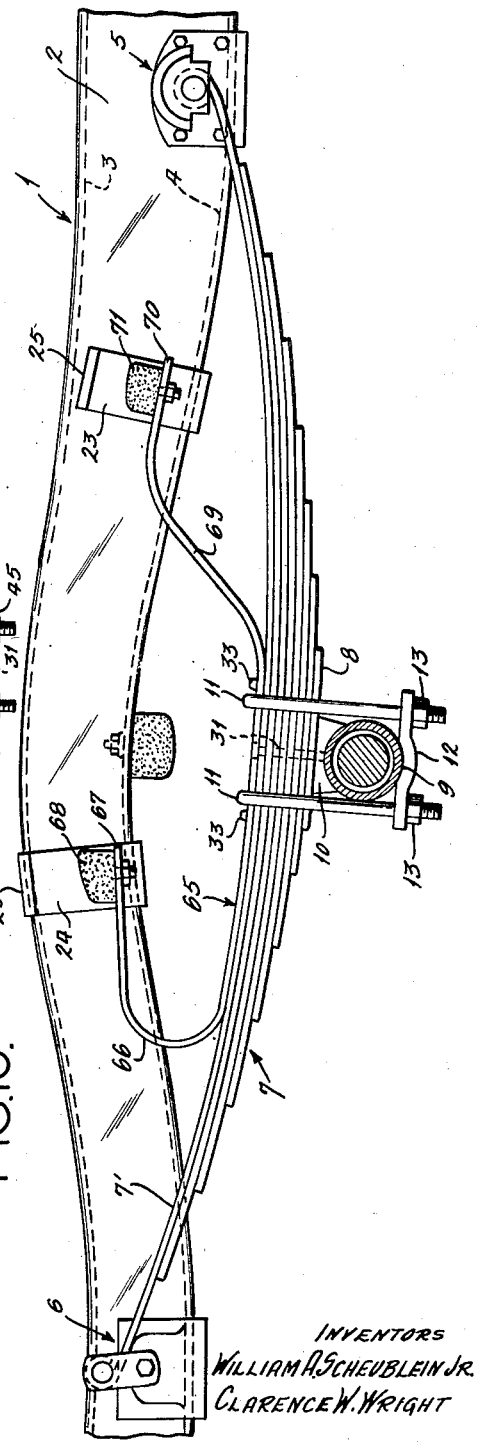

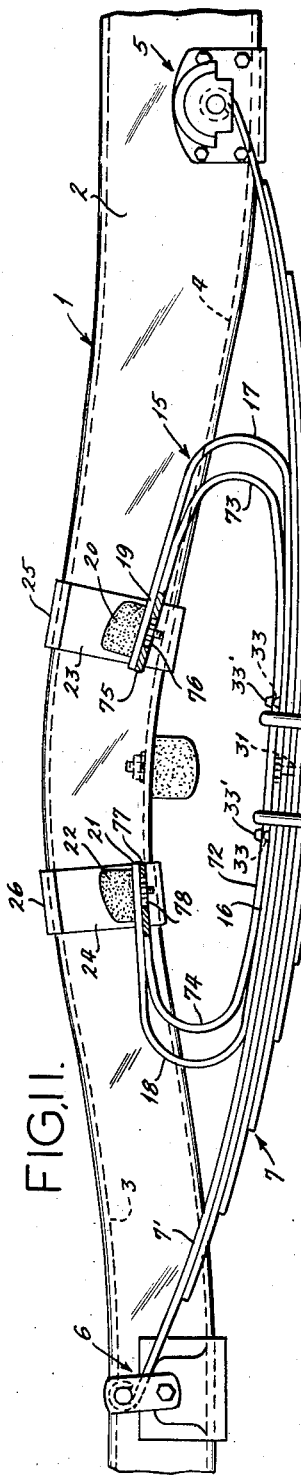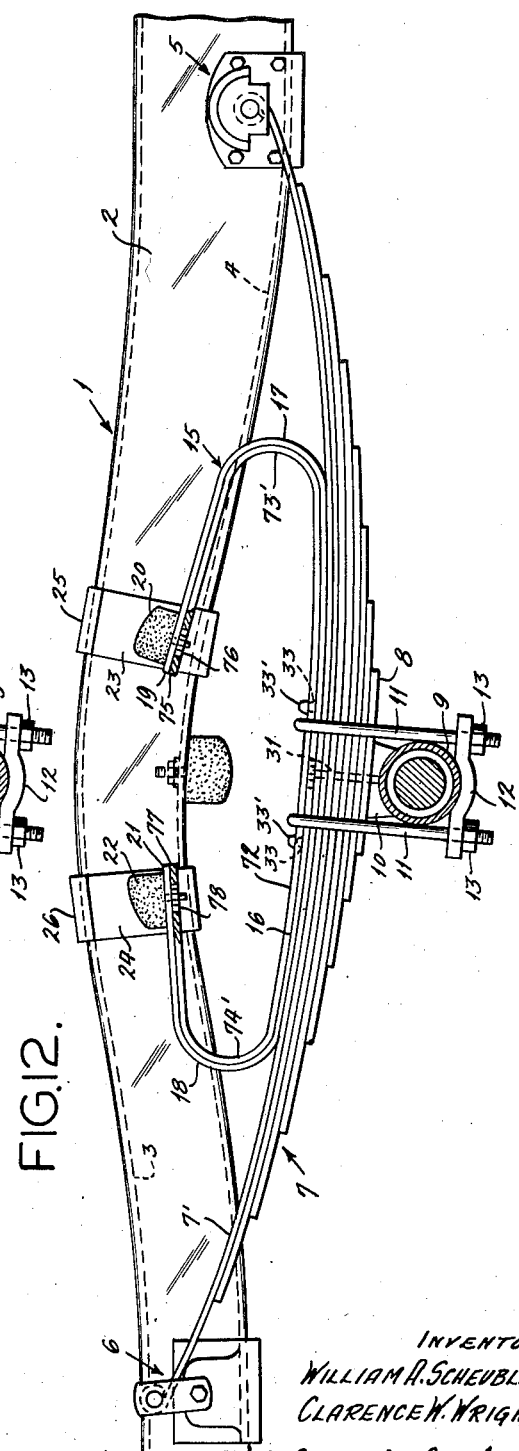

March 11, 1958  W. A. SCHEUBLEIN, JR., ET AL  2,826,407
OVERLOAD SPRING FOR VEHICLE
Filed Sept. 27, 1954  8 Sheets-Sheet 7

INVENTORS
WILLIAM A. SCHEUBLEIN Jr.
CLARENCE W. WRIGHT
By Gravely, Lieder, Woodruff & Wills
ATTORNEYS March 11, 1958 W. A. SCHEUBLEIN, JR., ET AL 2,826,407
OVERLOAD SPRING FOR VEHICLE
Filed Sept. 27, 1954 8 Sheets-Sheet 8

INVENTORS
WILLIAM A. SCHEUBLEIN JR.
CLARENCE W. WRIGHT
By Gravely, Lieder, Woodruff & Willie
ATTORNEYS

United States Patent Office 2,826,407
Patented Mar. 11, 1958

2,826,407

OVERLOAD SPRING FOR VEHICLE

William A. Scheublein, Jr., St. Louis, and Clarence W. Wright, Lemay, Mo., assignors to Moog Industries, Inc., St. Louis, Mo., a corporation of Missouri Application September 27, 1954, Serial No. 458,562

2 Claims. (Cl. 267—45)

This invention relates to overload springs for vehicles and is particularly directed to overload springs which are useful in increasing the load carrying capacity of vehicles.

An important object of this invention is to provide a simple overload spring which may be easily and quickly installed and replaced in the event of damage or breakage without the need for special tools or equipment.

It is a further important object of this invention to provide an overload spring which may be installed on vehicles having different arrangements and alignments of the normal springs and the chassis or frame parts.

It is also an object of this invention to provide a vehicle overload spring having improved and novel means for interconnecting it with the usual vehicle spring so that the original mounting of the usual vehicle spring will not be materially altered.

Yet another object hereof is to provide overload springs for use with vehicles having the usual vehicle springs either in alignment with or offset relative to the chassis or frame parts, and which may be used with vehicles having the usual springs set over the axle or slung below the axle.

This invention consists in the provision of overload spring means adapted to be connected with the usual vehicle chassis supporting springs and to be spaced from the vehicle frame parts or chassis under normal vehicle loading conditions, but to come into load carrying relation with the frame parts or chassis at such times as the vehicle load exceeds the capacity of the usual vehicle springs. The invention further consists in the provision of overload springs having the form and construction hereinafter more particularly pointed out and described in connection with the accompanying drawings wherein:

Fig. 1 is a fragmentary top plan view of a portion of a vehicle frame part and spring to which the overload spring has been added;

Fig. 2 is a fragmentary side elevational view of a vehicle frame part and spring illustrated in Fig. 1, but showing the overload spring in further detail;

Figs. 7 and 8 are similar fragmentary side elevational views similar to Fig. 6 wherein a partial overload condition is shown in Fig. 7 and a still greater overload condition is shown in Fig. 8;

Fig. 9 is a fragmentary side elevational view similar to Fig. 6, but showing a modified overload spring combined with the usual vehicle spring;

Fig. 10 is a fragmentary side elevational view of a vehicle frame part and spring similar to the assembly shown in Fig. 2, but disclosing a modified overload spring unit;

Fig. 11 is a view similar to Fig. 10 but disclosing a further modified overload spring unit;

Fig. 12 is a view similar to Fig. 11 wherein the overload spring therein shown constitutes a variation of the overload spring shown in Fig. 11;

The present invention is illustrated by the several forms of overload springs shown in the accompanying drawings, and it is noted that the overload springs are characterized by features which make them simple and fast to install, and replace in case of damage or breakage, and which require as few parts as possible so that any one with ordinary mechanical skill can easily and simply install the overload springs.

Figure 15:
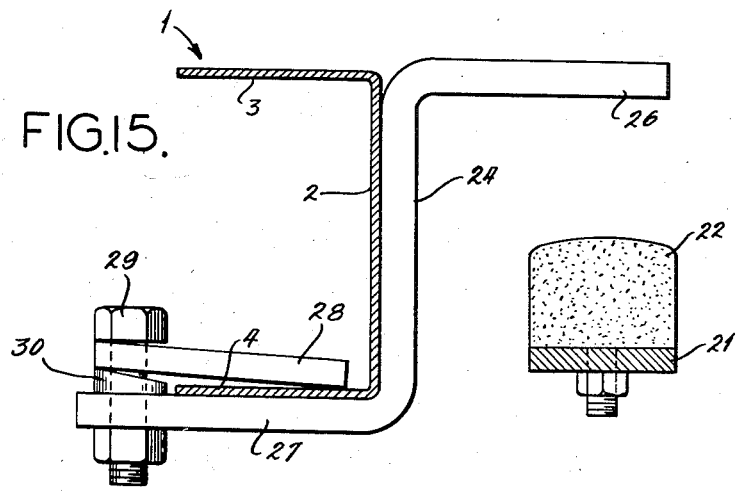
Fig. 15 is a fragmentary transverse sectional view as seen along line 15—15 in Fig. 2 of the means for connecting the overload spring bumper with the chassis or frame part.

Referring now to Figs. 1, 2 and 15, the frame part or vehicle chassis is shown at 1, and this part is usually a channel having the web set vertically and the spaced flanges directed horizontally and inwardly relative to the vehicle wheel position. The structural shape of vehicle frame part 1 may be seen in Fig. 15 wherein the web is shown at 2 and the upper and lower flanges respectively are shown at 3 and 4. The frame part 1 is provided with a forward spring mounting shackle 5 of usual construction and a rearward spring mounting shackle 6 also of usual construction. A leaf spring 7 having its ends suitably connected with the shackles 5 and 6 is arranged in outwardly offset relation with respect to the frame part 1. This arrangement may be seen upon comparison of Figs. 1 and 2.

The spring 7 is usually and preferably made up of a plurality of spring leaves, of which the upper leaf 7' extends the full distance between the shackles 5 and 6, and the other leaves are progressively shorter, ending with the shortest spring leaf at 8. Normally, the spring 7 is mounted on the vehicle axle housing 9 through the provision of a spring seat 10 engaging the spring leaf 8, and spaced U-bolts passing over the spring leaf 7' at the forward and rearward sides of the spring seat 10. Each of the U-bolts extends downwardly below the axle housing 9 where they may be suitably connected by a clamp plate 12 and nuts 13 threaded up on the ends of the U-bolts.

The foregoing description relates to one of the usual mountings of a vehicle spring in a laterally or offset relation with respect to the vehicle chassis and frame part 1 and no invention is to be predicated upon such usual construction per se.

In the arrangement just described, the overload spring 15 is formed with a central portion 16 and opposite and reversely curved portions 17 and 18 integral with the portion 16. The curved portion 17 terminates in a free end portion 19 carrying a buffer pad 20. Similarly, the curved portion 18 terminates in a free end portion 21 also carrying a buffer pad 22. Adjacent the free end portions 19 and 21 of the overload spring, the frame part 1 is provided with load receiving brackets or flange members shown respectively at 23 and 24. The bracket 23 is provided with an outwardly extending flange 25 which is adapted to be engaged by the buffer 20. The bracket 24 carries an outwardly extending flange 26 which is adapted to be engaged by the buffer 22. Each of the brackets 23 and 24 may be connected with the frame part 1 in the manner illustrated in Fig. 15. In this arrangement, the bracket 24 having the outwardly extending flange 26 is provided with a reversely directed mounting flange 27 which extends beneath the lower flange 4 of the frame part 1. A suitable clamping plate 28 is releasably connected with the mounting flange 27 by means of the threaded element 29 in conjunction with a fulcrum washer 30 so that the flange 4 is clamped between them. Fig. 15 also illustrates the relative position of the free end portion 21 of overload spring 15 and the outwardly projecting flange 26 on the bracket 24. The bracket 23 is mounted on the frame part 1 in like manner and need not be described herein. It is obvious that other connecting means than that shown at 28, 29 and 30 may be used for those parts.

It will be observed in Figs. 1 and 2 that the usual leaf spring center bolt 31 engages the spring seat 10 in the usual manner, but the U-bolts 11 must be reset to engage on the overload spring 15. Since the center bolt 31 normally has its enlarged head exposed on the upper surface of the spring leaf 7' it is necessary that the overload spring central portion 16 be formed with a suitable opening 32 to receive the head of bolt 31. The cooperation obtained between opening 32 and the head of bolt 31 serves to prevent longitudinal slippage between the overload spring 15 and the spring leaf 7'. Further prevention of longitudinal slippage of the two springs, and slippage or misalignment of the U-bolts 11 is obtained by providing upwardly extending projections or nibs 33 in the overload spring 15. The nibs may be formed as indicated in greater detail in Fig. 16.

Figure 3:
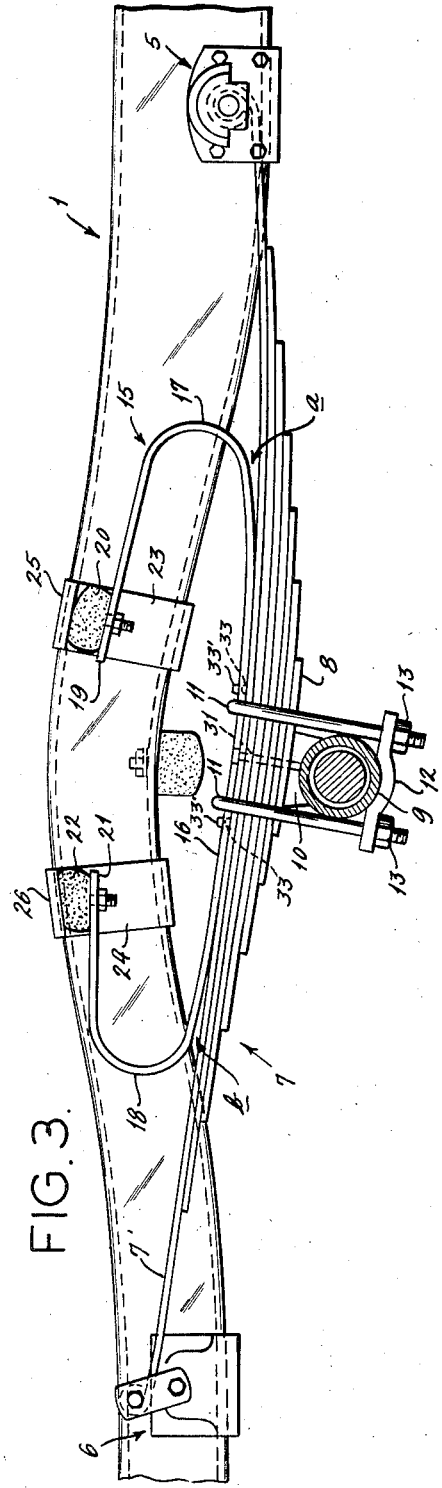
Figs. 3 and 4 are similar fragmentary elevational views similar to Fig. 2, but showing partial overload conditions in Fig. 3 and still greater overload conditions in Fig. 4.
Figure 4:
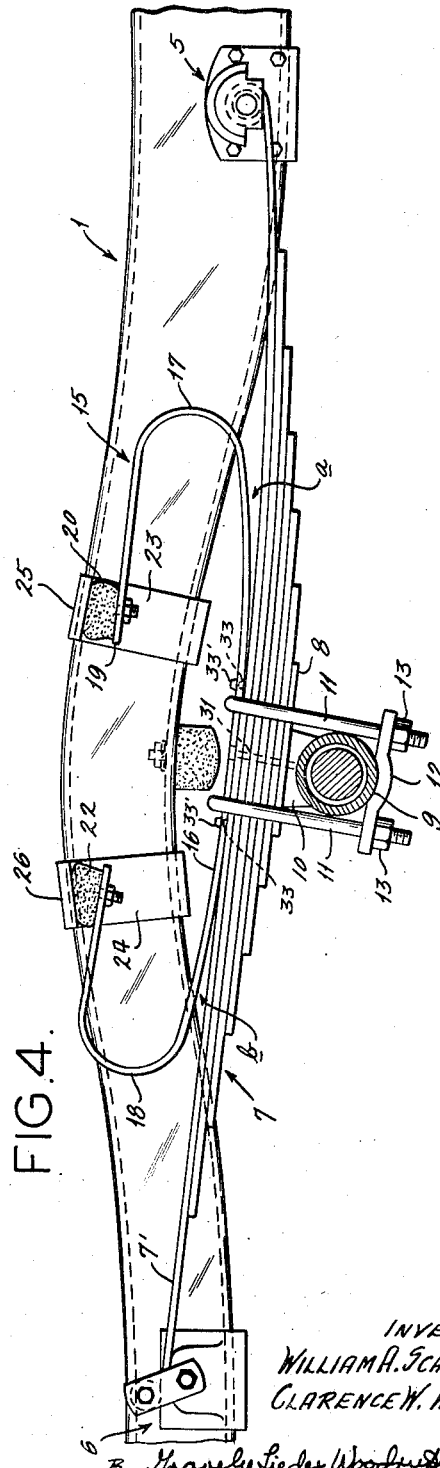

Reference will now be made to Figs. 3 and 4 in comparison to the disclosure in Fig. 2. The parts and elements of Figs. 3 and 4 are identical with those in Fig. 2 and similar reference numbers have been applied in these views. Fig. 3, as compared with Fig. 2, illustrates the initial action of the overload spring 15 when the buffers 20 and 22 establish contact with the outwardly directed flanges 25 and 26 on the brackets 23 and 24 carried by the vehicle frame part 1. The loading of the spring 15 initially causes flexure in the opposite curved portions 17 and 18 with a consequent slight degree of upward curling or rocking of the curved portions 17 and 18 which normally lie upon the upper surface of spring leaf 7'. This latter condition is exemplified by the space or gap shown at (a) adjacent curved portion 17 and space or gap (b) shown adjacent curved portion 18. In Fig. 4 the overload spring 15 is shown in a still further loaded condition relative to Fig. 3. Here the greater flexure in the curved portions 17 and 18 of the overload spring has caused the spring to curve upwardly away from the spring leaf 7', thereby increasing the extent of the gap or spaces shown at (a) and (b).

The action of the overload spring 15 which is progressively illustrated in Figs. 2, 3 and 4 clearly demonstrates that, as the vehicle loading approaches an overload condition, the overload spring is capable of resisting and distributing light overload over a large area of the usual leaf spring 7 of the vehicle so that rough riding is not encountered. This condition is illustrated in Fig. 3 where the contact between overload spring and the usual vehicle spring 7 is indicated. However, as the overload increases the overload spring 15 begins, as in Fig. 3 and continues as in Fig. 4, to transmit the forces between the vehicle frame part 1 and the leaf spring 7 in a more concentrated zone and upon a reduced area of the spring 7. This is illustrated by the progressive increase in the gaps or spaces (a) and (b) in the opposite curved portions of the overload spring shown at 17 and 18. Therefore, the tendency under overload conditions is for the overload spring to control the overload condition and by flexing inwardly on the main spring leaf toward the axle 9 concentrate the same at a zone in the usual vehicle spring 7 which is closely adjacent the axle 9 where the load may be better sustained. In other words, the shape of the overload spring, the inward location of ends 19 and 21 relative to the curved parts 17 and 18, and the deflection characteristics of the parts 17 and 18, with the free ends located inside the span between curved parts 17 and 18, is such that the overload is supported by the spring, and the spring transmits the load in an ever increasing concentration with load increase to the axle which is the prime load carrying member of the vehicle.

Figure 5:
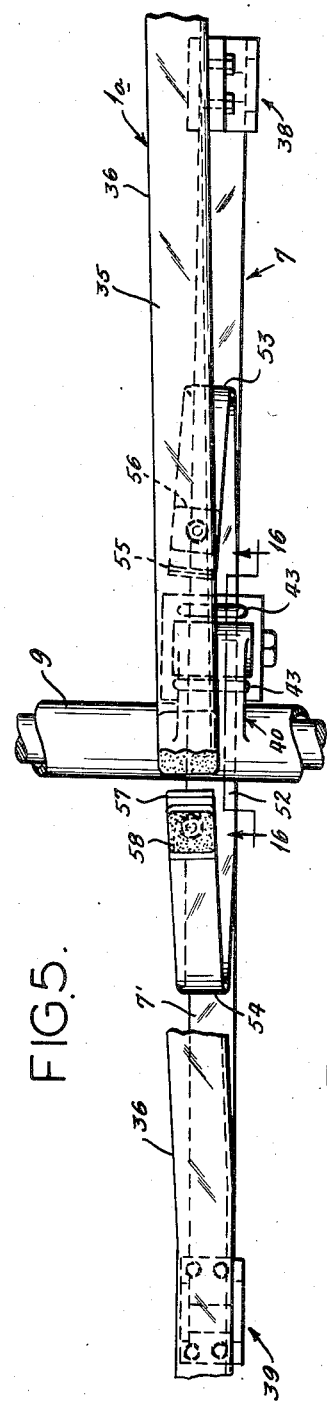
Fig. 5 is a fragmentary top plan view of a vehicle frame part having the usual spring in relative angular alignment therewith, and to which the overload spring of this invention has been added.
Figure 6:
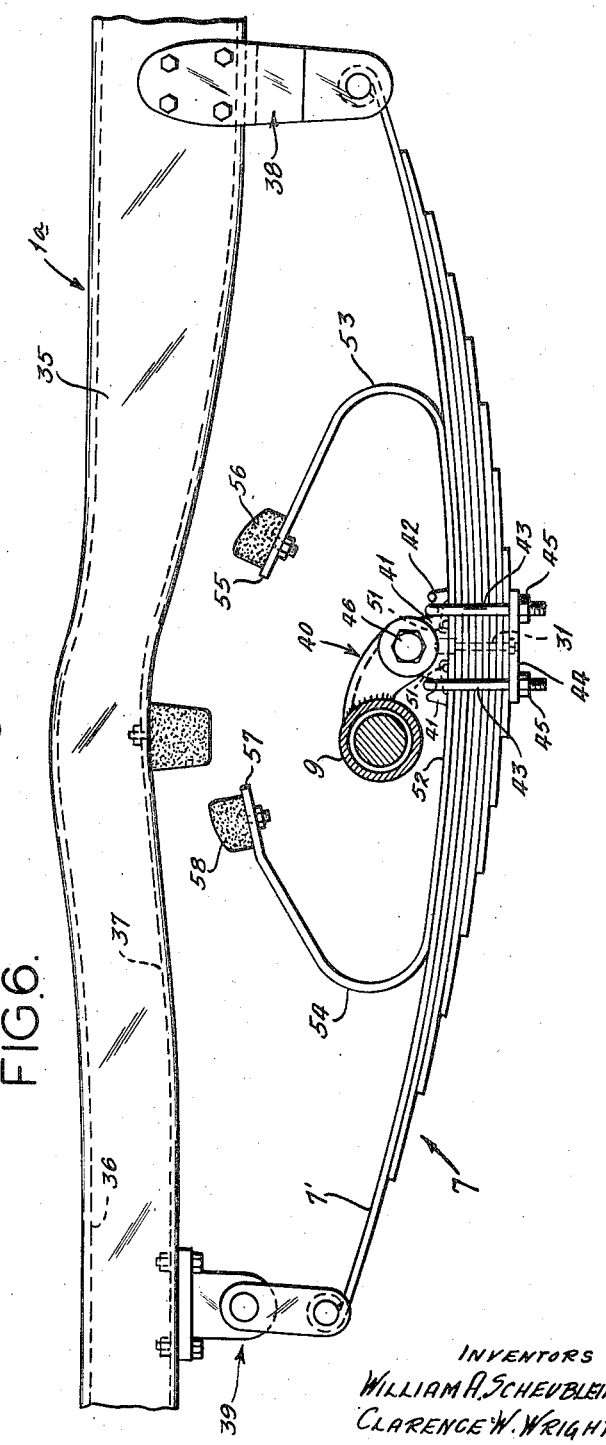
Fig. 6 is a fragmentary side elevational view of the vehicle spring assembly shown in Fig. 5.

Referring now to Figs. 5 and 6, a modified overload spring arrangement is disclosed in connection with the vehicle chassis member 1 (a) of channel section, wherein the web 35 is vertically directed and the upper and lower flanges 36 and 37 respectively are inwardly directed relative to the wheel position at the outer side of the vehicle. The chassis 1 (a) is provided with a front spring mounting device 38 of known construction and a rear shackle device 39, also of known construction. The main spring 7 has its main leaf 7' connected with the mounting device 38 and 39. In this arrangement the main spring 7 is not in longitudinal alignment with the vehicle chassis 1 (a), but is arranged in substantially perpendicular relation to the vehicle axle 9, whereas the chassis part 1(a) is angularly related with the axle 9. This arrangement results in the forward end of the main spring 7 being located somewhat outwardly of the chassis part 1(a). While this angular relation between chassis and main spring is illustrative, it is not to be construed as limiting, for the same may be of conventional parallel type, as in Fig. 1. It is further possible to use the same in an installation where the spring is in line with the chassis.

In Fig. 6, the vehicle axle 9 is provided with an offset hanger device 40 of cantilever type, and the outer end of the hanger 40 carries a spring seat 41 set in a bushing in the end of a hanger. This construction is shown more in detail in Fig. 16. The spring seat 41 is provided with recesses 42 to receive and position the usual U-bolts 43 in depending relation at each side of the main spring 7. The U-bolts 43 are adapted to connect with a clamping plate 44 and the assembly is secured in position by suitable threaded elements or nuts 45.

Figure 16:
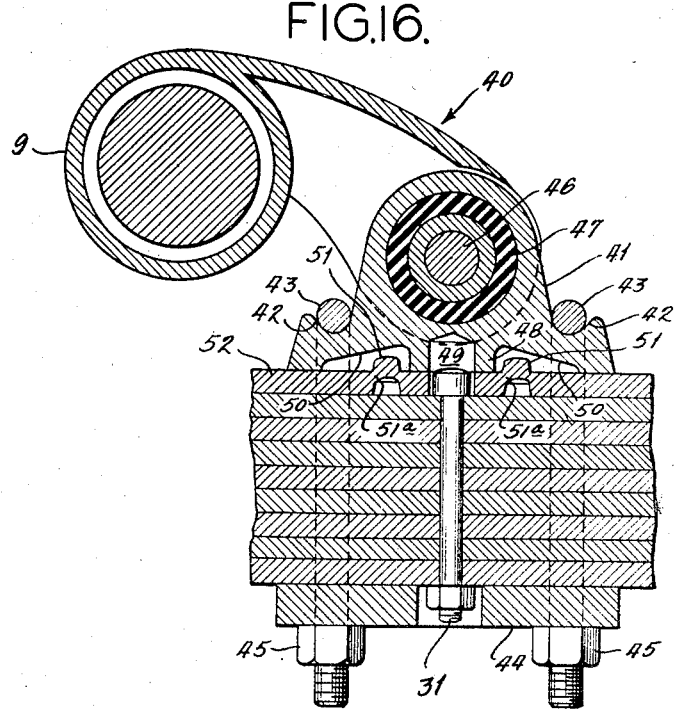
Fig. 16 is a greatly enlarged sectional elevational view of the vehicle axle and supporting means for mounting the usual vehicle spring and the overload spring in cooperative relation beneath the axle.

Referring to Fig. 16, the hanger 40 is provided with an end recess having a mounting pin 46 carrying a suitable bushing 47 on which the upper portion of the spring seat 41 is mounted. The spring seat is provided with the U-bolt receiving recesses 42 as indicated in connection with Fig. 6. Further, the spring seat 41 is provided with a central land 48 in its lower face in which a recess 49 is formed to receive the head of the spring center bolt 31. The seat member 41 is also provided with a plurality of recesses 50 arranged in flanking relation to the central recess 49. The recesses 50 are adapted to receive the nib elements or bosses 51 formed in the central portion 52 of the overload spring associated with main spring 7 whereby relative slippage between the spring seat, overload spring 52 and the main spring 7 is adequately and fully prevented.

The nibs 51 (Fig. 16) in the overload spring portion 52 are formed by displacing the material of the spring with a suitable punch and die to raise the nibs and leave a hollow or pocket in the reverse side. The nibs 51 are not wholly punched through as it is the purpose to have the nibs resist shear forces created by relative movement between the parts of the assembly. Thus, in Fig. 16, each nib 51 has a circular connecting area of material 51a which is sufficient to resist the shear loads imposed. The foregoing description of nibs 51 may be applied to all such nibs disclosed in any of the views of the drawings, as nibs 33 in Fig. 2 and nibs 33 and 33' in Fig. 11.

Again referring to Figs. 5 and 6, it will be observed that overload spring is provided with opposite curved portions 53 and 54, the portion 53 terminating in a free end 55 having a suitable buffer 56 and the portion 54 terminating in a free end 57 provided with a buffer 58. Because of the relative angular relation between the vehicle chassis 1(a) and the main spring 7, the overload spring has its curved portions 53 and 54 twisted at an angle to the intermediate portion 52 so that the free ends 55 and 57 do not lie directly over the intermediate portion 52 but are laterally offset, and in this case the offset is inwardly of the vehicle. This construction of the overload spring results in the curved portions 53 and 54 having a skewed relation with the intermediate portion 52 so that the buffers 56 and 58 will be located beneath the chassis 1(a) for the purpose of striking the inturned flange thereof at such times as a load on the vehicle exceeds the normal capacity of the main spring 7.

Fig. 6 discloses the combination of the vehicle main and overload springs for load conditions not exceeding the capacity of the main spring 7. On the other hand, Fig. 7 illustrates the same main and overload spring combination as is shown in Fig. 6 but under the initial action of the overload spring for handling light overload conditions. It will be noted that the buffers 56 and 58 are now in contact with the lower flange 37 of the chassis 1(a) and the curved portions 53 and 54 have undergone initial flexure causing the portions thereof adjacent the main spring leaf 7' to begin upward rolling or rocking reaction. This rolling or rocking reaction is indicated for the curved portion 53 at (a) and for the curved portion 54 at (b). Fig. 8 is a further view of the main and overload spring combination in which the overload spring has undergone considerable deflection for heavy overload conditions, and it is particularly brought out in this view that the flexure in the curved portion 53 of the overload spring has produced a greater gap at (a), and similarly the flexure in the curved portion 54 has produced a greater gap at (b). The action of the overload spring under increasing overload conditions is to transmit the overload more nearly into the main spring 7 in the zone of or at the spring seat position, thereby avoiding loading the main spring 7 in the outward portions where the number of spring leaves is reduced and the resistances thereof is less. Furthermore, the position of ends 55 and 57 inwardly of the curved portions 53 and 54 respectively results in the flexing action and the concentration of load over the axle with increase of the overload.

Fig. 9 discloses a modified arrangement of main and overload spring assembly of the type first disclosed in Fig. 6. In the modified arrangement the overload spring is provided with an auxiliary spring 60 shown connected with the free end 55 of the main overload spring so that the result is a two stage overload spring which permits the vehicle to carry greatly overrated loads. The auxiliary spring 60 is provided at one end with a flange 61 adapted to engage across the end face of the free end portion 55 to prevent skewing. The means for securing the buffer 56 on the free end portion 55 is now utilized to secure the auxiliary spring 60 in position. The opposite end of the auxiliary spring 60 is provided with a buffer 62 adapted to contact the intermediate portion 52 of the main overload spring close to the spring seat 41 so that the reaction of the curved portion 53 of this spring will not be unduly restricted and the load will be transmitted to the axle without subjecting the weaker portions of the main spring 7 to excessive load. The action of the overload spring is to concentrate the overload in the manner noted above.

Fig. 10 discloses a variation in the form and arrangement of the overload spring first shown in Fig. 2. In certain installations it sometimes happens that the overload spring in the form shown in Fig. 2 cannot be utilized because of the presence of an obstruction or part of the vehicle which cannot be altered. The overload spring shown at 65 in Fig. 10 is one form thereof which may obviate the obstruction difficulty and allow installation of the overload spring. It is noted that the curved end 66 of this overload spring is provided, as previously pointed out in Fig. 2 with a free end portion 67 having the buffer 68 thereon inside the curved portion 66 and adapted to engage the flange 26 on the bracket 24 under overload conditions. The opposite end portion 69 of this overload spring now assumes the curved form of a gooseneck in which the free end 70 is provided with a buffer 71 to engage flange 25 on bracket 23. Bracket 23 is necessarily repositioned on the chassis member 1 due to the construction condition encountered, but the bracket 23 is in nowise changed in its physical form. The curved portion 66 of the overload spring 65 reacts under overload conditions to flex inwardly toward the connection 43 or curl upwardly away from the main spring leaf 7' so that the load transmitted through this portion of the overload spring moves toward and concentrates adjacent the position of the axle 9 with overload increase. The goosenecked portion 69 of the overload spring has a very slight tendency through increased overload conditions to roll outwardly along the main spring leaf 7'. This action is so slight that it does not materially increase its area of contact and does not increase the distance between the axle 9 and the center of load transmitted through the portion 69. However, the portion 69 does not change the essential characteristic of the combination main and overload springs, particularly with respect to the load concentrating effect of the overload spring with increasing overload conditions.

Fig. 11 illustrates the main and overload spring combination first disclosed in Fig. 2. However, overrated loads may be taken care of by the auxiliary overload spring 72 which is mounted upon the central portion 16 of the overload spring 15. Relative slippage between these two springs is prevented by means of nibs 33' in the auxiliary springs 72 providing sockets for receiving the nibs 33 formed in the spring 16. Auxiliary spring 72 has opposite curved portions 73 and 74 which are formed on a radius which is smaller than the radius of the curved portions 17 and 18. The free end 75 of curved portion 73 engages on the undersurface of the free end 19 and has sliding contact therewith through the provision of a suitable slot 76 which receives the securing element for the buffer 20. Similarly, the free end 77 on the curved portion 74 has sliding engagement with the free end 21 through the provision of a suitable slot 78 which receives the securing means for the buffer 22. In this arrangement of the auxiliary overload spring, the curved portions 73 and 74 thereof are free to undergo flexure independently of the reactions of portions 17 and 18. This avoids close tolerances in forming and fitting the curved portions 17 and 73, as well as 18 and 74.

Fig. 12 discloses a variation in the arrangement of auxiliary overload spring 72 disclosed in Fig. 11. In the arrangement of Fig. 12, the auxiliary overload spring has portion 73' formed to fit the curvature of the portion 17. Similarly the curved portion 74' is formed to fit the curvature of portion 18. Where the overload and auxiliary overload springs are made to conform as in Fig. 12 the result is a much stiffer overload spring combination than would be obtained by the arrangement disclosed in Fig. 11. There are certain advantages in providing flexible as well as stiff overload springs and these conditions may be met conveniently by the constructions illustrated in either Fig. 11 or Fig. 12.

Figure 13:
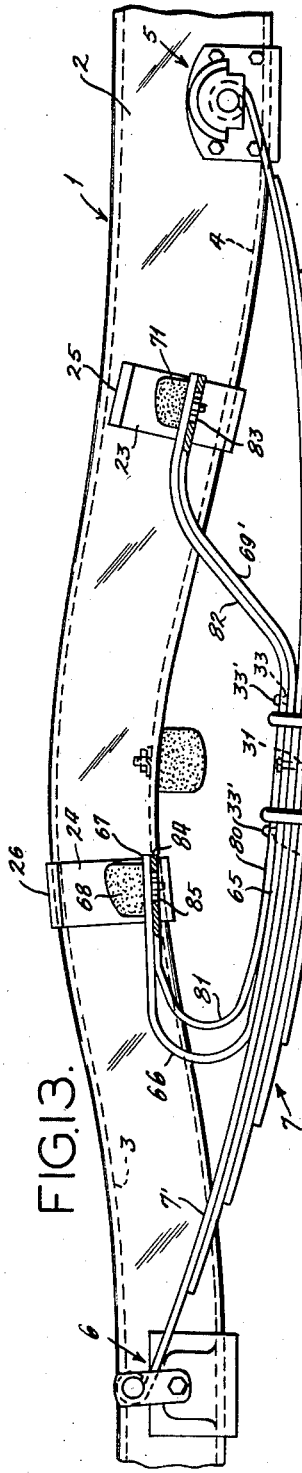
Fig. 13 is a view similar to Fig. 10, but disclosing a modified overload spring unit.
Figure 14:
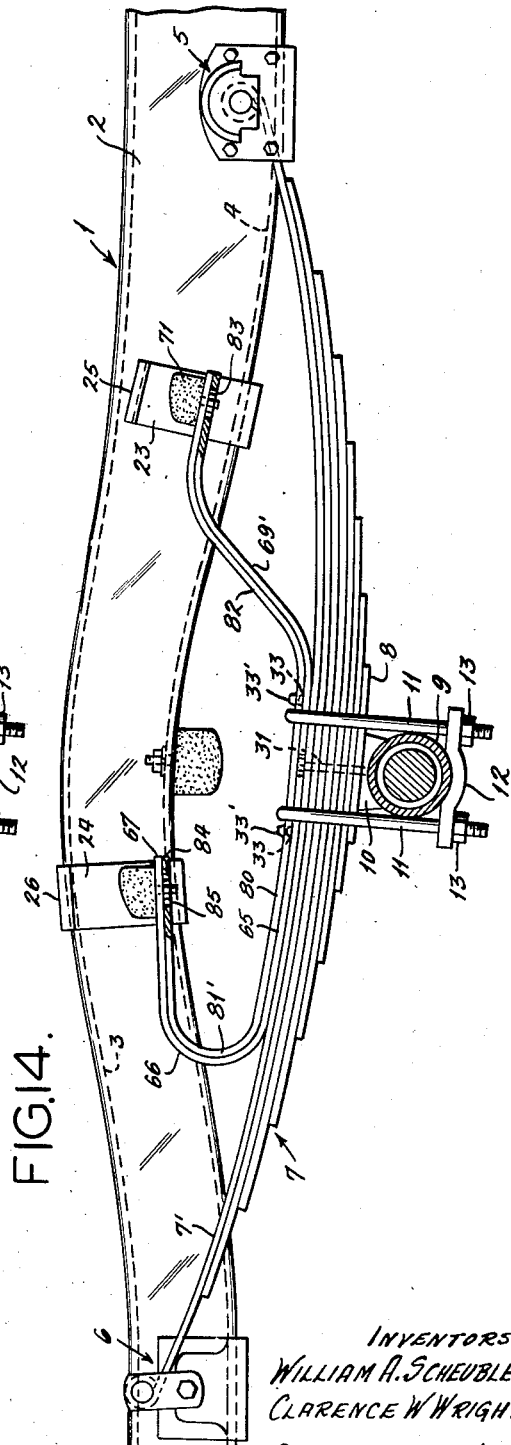
Fig. 14 is a view similar to Fig. 13 wherein the overload spring constitutes a modification of the overload spring shown in Fig. 13.

Figs. 13 and 14 illustrate the variations over the overload spring arrangement above disclosed in connection with Fig. 10. The overload spring 65 in Fig. 13 is now provided with an auxiliary overload spring 80 having the curved portion 81 formed to a reduced radius relative to the adjacent curved portion 66, and a goosenecked portion 82 which is made to conform to a modified goosenecked portion 69' on the auxiliary spring 65. In Fig. 10, the goosenecked portion 69 supports the buffer 71, but now the goosenecked portion 82 carries the buffer 72 and the modified portion 69' is formed with a suitable slot 83 to provide relative movement between the two goosenecked portions as is clearly necessary. The portion 81 has its free end 84 provided with a suitable slot 85 so that relative movement may be possible between the ends 67 and 84. Fig. 14 discloses a modification over the overload spring combination disclosed in Fig. 13. Here the overload spring 80 has been modified with respect to the curved portion 81' so that its curvature matches that of the curved portion 66 thereby providing a relative stiffer overload spring, as compared with the overload spring combination shown in Fig. 13. In other respects the disclosure in Fig. 14 is similar to that of Fig. 13.

What is claimed is:

1. In an overload device for a vehicle having a frame part and an axle, a main spring connected at its ends to the frame part of the vehicle and connected at its medial zone to the vehicle axle, an overload supporting spring member having an elongated medial portion and reversely curved extremities, said elongated portion bearing upon the medial portion of the main spring at both sides of the axle and said curved extremities having normally free ends located above the main spring and directed toward each other at an upwardly inclined angle, the ends of said spring member being normally free of contact but supportingly engaging the vehicle frame part with applied overload on the vehicle, and means securing the medial portion of said spring member to the main spring at the medial zone thereof connected to the vehicle axle, said curved extremities of said spring member reacting under overload stress to flex in a direction inwardly and upwardly relative to the main spring to decrease the bearing area between said member and main spring, thereby concentrating the overload reaction from the overload spring member in the main spring more nearly over the vehicle axle.

2. In an overload device for a vehicle having a frame and an axle in spaced relation, a main spring connected near its ends to the vehicle frame and connected to the axle at a medial zone, said main spring resiliently supporting the frame from the axle and transmitting the vehicle load into the axle, an overload spring mounted at a medial zone upon the medial zone of said main spring, said overload spring including a central portion extending outwardly from the medial zone in both directions and in surface contact throughout its length with said main spring under no-load conditions thereof, opposite reversely curved portions extending from said central portion and directed upwardly toward the vehicle frame, and end portions extending toward each other and angularly inclined above the medial zone of said overload spring and engageable with said frame, and means securing the medial zone of said overload spring to said main spring, whereby the application of load to the ends of said overload spring causes flexure in said curved portions and gradual flexure in the central portion from said curved portions inwardly toward said securing means to decrease the surface contact of said main and overload springs to bring the overload stress inwardly toward the vehicle axle.

References Cited in the file of this patent

UNITED STATES PATENTS

| | | |
|---|---|---|
| 99,249 | Sheldon | Jan. 25, 1870 |
| 1,086,182 | Jackson | Feb. 3, 1914 |
| 1,173,850 | Oliver | Feb. 29, 1916 |
| 1,422,956 | Gaar | July 18, 1922 |
| 1,508,324 | Helsel | Sept. 9, 1924 |
| 1,546,144 | Mills | July 14, 1925 |
| 1,597,704 | Young | Aug. 31, 1926 |
| 2,587,522 | Pilkington | Feb. 26, 1952 |

OTHER REFERENCES

"Motor," July 1954, page 123.